United States Patent [19]
Lusk et al.

[11] 3,758,699
[45] Sept. 11, 1973

[54] APPARATUS AND METHOD FOR DYNAMICALLY COOLING A CABLE TERMINATION

[75] Inventors: George E. Lusk, Downers Grove; James H. Nicholas, Flossmoor, both of Ill.

[73] Assignee: G & W Electric Specialty Company, Blue Island, Ill.

[22] Filed: Mar. 15, 1972

[21] Appl. No.: 234,898

[52] U.S. Cl. ................................. 174/19, 174/15 C
[51] Int. Cl. ............................................. H02g 15/22
[58] Field of Search ..................... 174/19, 20, 15 R, 174/15 C, 15 BH, 14 R, 14 BH, 16 R, 16 BH, 73 R, 21 R

[56] References Cited
UNITED STATES PATENTS

| 3,143,591 | 9/1964 | Flamand | 174/19 X |
|---|---|---|---|
| 3,163,807 | 12/1964 | Linderholm | 174/73 RX |
| 2,727,938 | 12/1955 | Nicholas | 174/19 |
| 3,553,342 | 1/1971 | Papadopulos | 174/15 C |
| 3,588,319 | 6/1971 | Isogal | 174/73 RX |
| 3,471,628 | 10/1969 | Harmon | 174/19 X |
| 3,013,101 | 12/1961 | Domenach | 174/19 X |

FOREIGN PATENTS OR APPLICATIONS

| 1,321,595 | 2/1963 | France | 174/19 |

Primary Examiner—Bernard A. Gilheany
Assistant Examiner—A. T. Grimley
Attorney—William E. Anderson et al.

[57] ABSTRACT

A cable termination cooling system circulates an insulating dielectric liquid through a heat exchanger and selected internal regions of a high voltage cable termination, to dynamically cool, without degradation of the dielectric characteristics of the cable termination. The current carrying capacity of the cable within the termination is thereby effectively increased, together with the energy transferring capabilities of the cable system with which it is associated.

27 Claims, 8 Drawing Figures

Patented Sept. 11, 1973

Patented Sept. 11, 1973
3,758,699
3 Sheets-Sheet 3
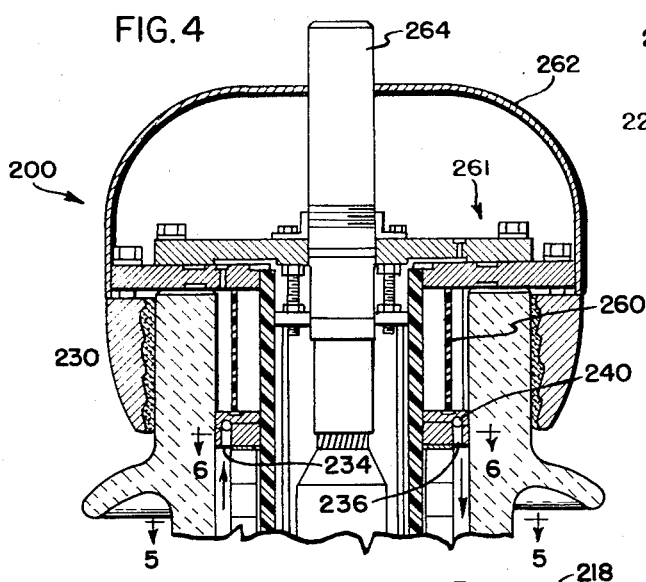
FIG. 4
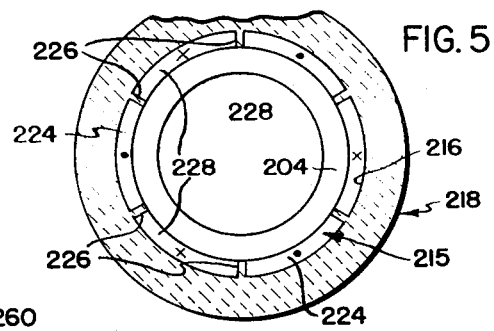
FIG. 5
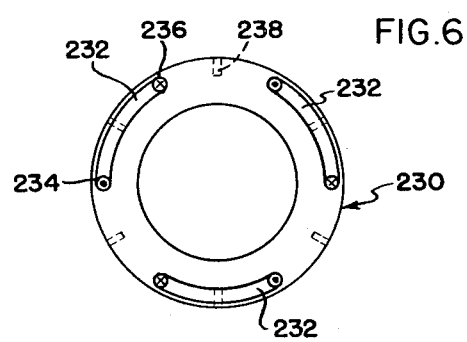
FIG. 6
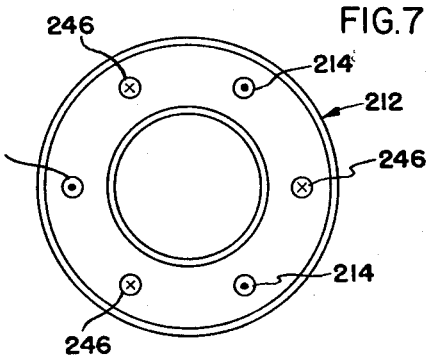
FIG. 7
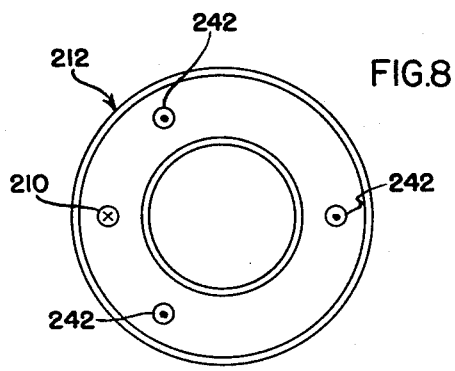
FIG. 8
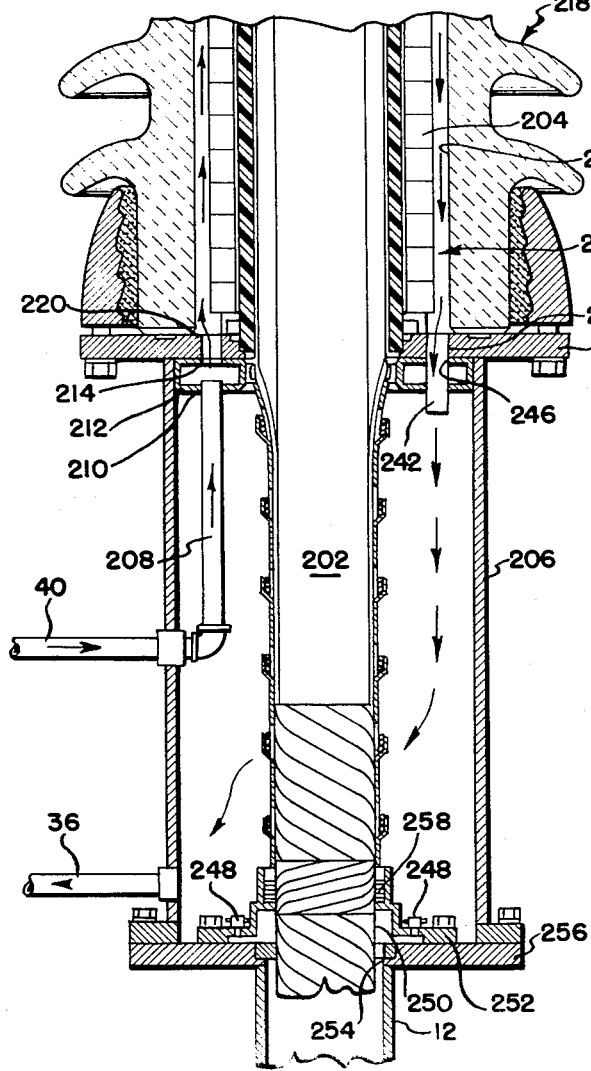

APPARATUS AND METHOD FOR DYNAMICALLY COOLING A CABLE TERMINATION

The present invention relates to high voltage terminations, and more particularly to a system and method for dynamically cooling high voltage terminations, or potheads.

The word "pothead" has been commonly used in the industry interchangeably with cable termination, terminator or terminal. The term "cable termination" will be used throughout this application to cover the complete assembly of cable, riser pipe, support structure, etc., as it would be ready for service. The term "pothead" will be used to cover the device and materials normally supplied by the manufacturer to terminate the cable in the field. An Institute of Electrical and Electronic Engineers (I.E.E.E.) Number 48 "Standard For Potheads," issued May, 1962, generally covers the terminology for these devices.

In the transmission and distribution of electrical energy by means of underground or subterranean power cables, it is common practice to employ a high pressure, oil filled, pipe-type cable system which may be used for the transmission and distribution of considerable blocks of electrical energy. Where only dielectric strength and protection are significant, and no forced cooling is required to achieve the required electrical power transfer, such a system typically employs a static hydraulic pressure, with oil being pumped into or discharged from the pipe (and certain related components) to maintain the oil-immersed cable insulation under a given pressure, such as of the order of 200 psi.

However, it is often the case that a dynamic or circulating hydraulic oil system is used with such pipe cable systems to increase the current carrying capacity of the cable for a given conductor size, the oil then being circulated through the pipe and some type of heat exchanger by a pump, while still maintaining, for example, the same pressure of about the order of 200 psi.

Although the capability of such underground cable systems to transmit the electrical energy is influenced by a number of different factors, generally the most important are those relating to thermal conditions. Thus, the current carrying capacity of such a system for a given cable conductor size is typically increased considerably by employing such an oil circulating system with heat exchangers to generally remove heat from the oil, and thus from the cable, and to avoid the generation of "hot spot" temperatures. The cable heat generation in the more common pipe cable systems is primarily due to $I^2R$ losses, which increase rapidly with current, and also increase with temperature through higher conductor resistance. In the E.H.V. (extra high voltage) class of pipe cable systems, dielectric losses in the cable insulation may contribute appreciable heating.

While the design and construction of such a dynamic pressure hydraulic system are relatively easily accomplished for cooling the major part of the pipe cable system (e.g., through the underground pipes, spreader heads, risers, etc.), oil circulation through the cable terminations at the potheads, presents very substantial problems because of material differences in basic structure and design considerations from those involved in the pipe cable system, itself. This is especially so for high voltage potheads rated, for example, at 138 Kv. and higher. In fact, as discussed in greater detail hereinafter, many of the structural features involved in the basic design criteria for such potheads, such as those required for high resistance to dielectric breakdown and maximum electrical insulation, are contrary and adverse to the desired structural features which would readily accommodate a circulating coolant through the cable termination structure.

More particularly, the oil flow through the pipe cable portion of the system is typically conducted through a space which is relatively large so that the flow passages or channels are not generally restrictive to the flow of oil. And, also, any reductions in dielectric strength due to any metal or semiconductive particles or other factors associated with the oil flow are not especially critical since the high voltage gradient is normally not applied across the oil. For example, in a typical oil filled pipe-type cable, the electric field would essentially be confined between the central cable conductor and a shield, and the oil flow would take place in the space between the shield and the inside diameter of the pipe. (Where an oil filled hollow core type of cable is employed, high electric field stresses are also not present across the oil because it flows along a central or axial passage located within the cable conductor, itself.) Generally a semi-stop structure is incorporated into the base of the pothead and check valve-filter units are used to filter the oil which may enter the pothead zone. Additionally, there is little problem providing passages with large enough cross-sectional areas to pass a sufficient oil flow to obtain the desired cooling of the cable.

At the cable terminations, however, a completely different situation exists, and it is not practicable for several reasons to merely conduct this pipe oil through the potheads. First, due to the necessary electrical insulating and dielectric requirements of the termination structure, there is inherently a considerable amount of electrical insulation, and consequently thermal insulation, in the radial heat flow path from the cable conductor to the air or other ambient media at the exterior surface of the pothead. This insulation is present since most cable terminations require the use of stress relief cone insulaton and/or stress controlling capacitors in the pothead in addition to the insulation already included on the cable conductor, and high dielectric insulating qualities are required in the insulative components used in the termination construction.

Second, although the high voltage terminations are hermetically sealed and contain oil under high static pressure conditions for dielectric reasons and to exclude moisture entry, any oil channels or ducts within the stress controlling insulations, and/or capacitor arrangement, must be kept quite small because the dielectric breakdown strength of the oil decreases substantially when it is not separated into relatively thin zones or laminations of oil and solid dielectric materials. However, the thermal conductivity of the oil is only increased when the layer is sufficiently thick to permit convection currents to flow, and thus the very thin oil layers required for good dielectric characteristics, produce a very low thermal conductivity which impairs the normal cooling of the conductor by radial heat flow through the termination. This also results in the dielectric characteristics being generally at odds with the cooling requirement that the channels or ducts be large enough to permit sufficient coolant flow for adequate heat removal.

Furthermore, the forced circulation of some insulating liquids, such as the oil typically employed in oil filled pipe cable systems, through the pump, heat exchanger, and associated piping, may produce a deleterious effect upon the dielectric characteristics of the liquid. For example, several metals, in the presence of some mineral or synthetic insulating liquids, may act as catalytic agents causing the formation of hydroperoxide compounds which cause an increase in the power factor of the insulating liquids at high temperatures. Generally, this catalytic action of the metal is increased by higher temperature and velocity of flow of the insulating liquid. Steel is generally used for the pipe cable system, and although it is somewhat less active than copper (which is the most active catalytic metal normally associated with high voltage cables) its effects in this respect are still significant. Thus, these effects contribute further to the substantial problems involved in dynamically cooling high voltage terminations, and especially in using a common oil system with the pipe cable and riser.

Therefore, considering the relatively high thermal resistance in the radial heat flow path from the cable conductor to the outer surface of the pothead, and the severe restrictions on forced internal cooling, the cable terminations may place significant limitations on the current carrying capacity of the overall pipe cable system, especially where the other portions of the system employ dynamic cooling and are not so limited.

Accordingly, it is an object of the present invention to provide a system and method for dynamically cooling high voltage cable terminations by the circulation of oil, or other insulating liquid, through a pothead, without the aforementioned deleterious results and without significant degradation of the electrical characteristics of the termination, to thereby increase its current carrying capacity for a given cable conductor size.

In accordance with the present embodiments of the invention, this is accomplished by passing oil (or other insulating liquid of relatively high dielectric strength) axially through the pothead structure in regions of relatively low electric field strength, and particularly in a passage or passages located radially beyond the surface of the dielectric stress controlling insulations, but within the bore of the pothead insulator section, so that the cross-sectional area of the flow passage (which may form channels or ducts through the termination) may be large enough to permit sufficient oil flow for adequate cooling of the cable termination. Cooling in this manner is practicable because the electric field just within the inside diameter or bore of the outer insulator is of generally smaller magnitude than in the region of the stress controlling insulations so that a larger volume (i.e., thicker layer) of oil, with its attendant reduced dielectric strength, but increased thermal conductivity, will not significantly degrade the electrical characteristics of the termination. Also, the outer insulator section, typically being of porcelain, has a relatively low thermal resistance, as compared to that of the stress controlling components.

Thus, in this generally annular region, a large annular channel, or relatively large ducts, may be utilized or incorporated into the pothead design to handle the flow of insulating liquid to effect internal cooling, and thereby obtain an increase in the permissable current rating of a given conductor size cable termination so as to be consistent with the current rating of a dynamically cooled, high pressure pipe cable system in which the termination may be employed.

Suitable filters are preferably employed in the pothead oil circulating system to remove hydroperoxide compounds and other undesirable particles and substances from the insulating dielectric liquid coolant. Additionally, copper, steel and other catalytic action metals are preferably "isolated" from the insulating dielectric liquid coolant by non-active metallic or non-metallic coatings.

The insulating liquid is preferably circulated axially (i.e., in a direction generally parallel to the cable axis) through the pothead, through a heat exchanger, and back through the pothead by means of a recirculating pump, while a high liquid pressure (e.g., typically about 200 psi) is maintained within the pothead by the main hydraulic system associated with the oil filled pipe cable and riser normally connected to the base of the pothead. Therefore, the operating or static pressure of the insulating liquid dielectric is maintained by the cable system pumping plant, while the pump associated with the termination heat exchanger is required only to withstand the system nominal pressure for circulating the dielectric liquid within the pothead. Although the high static pressure within the pothead is maintained by the main pipe cable system through some means, such as check valves or the like, the oil circulating system of the main pipe cable (or alternate oil flow operation from one pumping plant to another) is not otherwise associated with the cooling system of the cable termination, the closed loop of which is confined generally thereto.

The cooling system for the pothead may employ merely a simple heat exchanger at ambient temperature or, alternatively, a sub-ambient temperature cooling unit, and the term "heat exchanger" as used herein is intended to encompass all means for effecting removal of heat from the insulating liquid. The degree of cooling required will, of course, be primarily dependent upon the ambient temperature of the air or enclosure media surrounding the pothead, the amount of solar radiation incident upon the pothead, and a time integral of the cable conductor current, the principal source of heat to be removed being the $I^2R$ losses in the cable conductor and the dielectric losses within the stress control components.

Other objects and advantages of the present invention will become apparent from the following detailed description, taken in connection with the accompanying drawings, in which:

FIG. 4 is a sectional view of a pothead in accordance with another embodiment of the present invention;

FIG. 5 is a partial sectional view taken along line 5—5 of FIG. 4 in the direction of the arrows, and diagrammatically showing exemplary directions of liquid flow through the pothead;

FIG. 6 is a partial sectional view of an upper manifold taken along the line 6—6 of FIG. 4 in the direction of the arrows, and diagrammatically showing directions of liquid flow;

FIG. 7 is a top plan view of a lower manifold employed in the embodiment shown in FIG. 4, and diagrammatically indicating the directions of liquid flow through the various upper ports thereof; and FIG. 8 is a bottom plan view of the manifold of FIG. 7, diagrammatically indicating the directions of liquid flow through the lower ports thereof.

Figure 1:
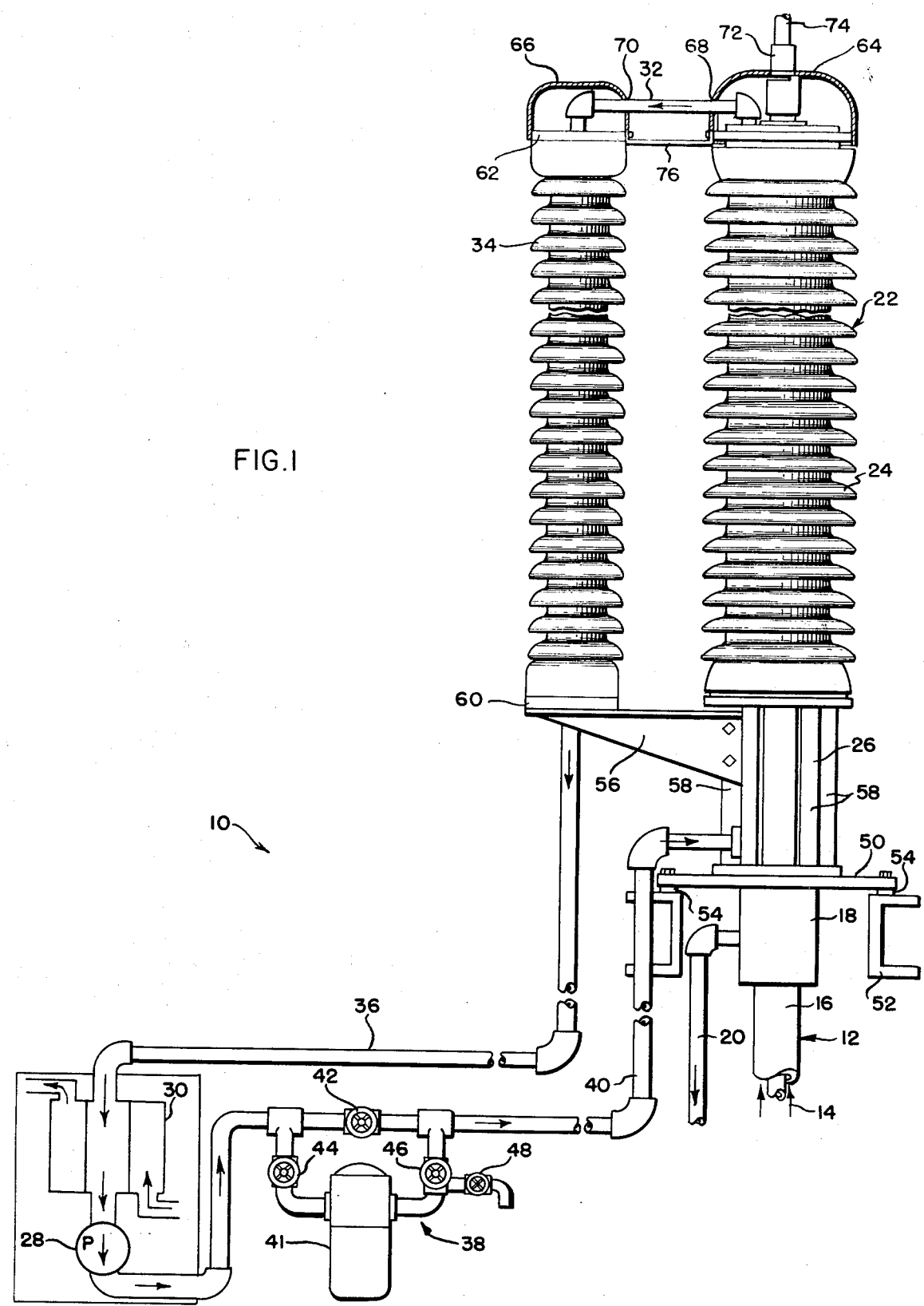
FIG. 1 is an elevational view schematically showing an embodiment of a pothead cooling system in accordance with the present invention.

Referring now to FIG. 1, there is generally shown a high voltage cable termination cooling system 10 for use with an oil filled pipe-type cable system 12 having oil circulation, under high pressure, in the direction of the arrows 14, up through riser pipe 16, riser manifold 18, and down through return pipe 20, to a main pumping station (not shown). The cable termination cooling system 10 comprises a pothead 22 having a liquid flow passage parallel to the cable and pothead axis and disposed in proximity to the inside diameter or bore wall of the pothead porcelain insulator section 24, and a hollow entrance-body section 26 communicating with the lower end of the flow passage. The system further comprises means coupled to the other end of the flow passage and to the entrance-body section for circulating an insulating liquid dielectric therethrough, the liquid circulating means including a pump 28 and heat transfer means 30 for removing heat from the liquid dielectric acquired during its flow through the pothead 22.

The insulating liquid dielectric is typically a high dielectric strength oil which is passed up from the entrance-body 26, through the axial passage of the pothead 22, and then conducted from the top of the passage through exhaust return pipe 32 at the high voltage end, downwardly through a hollow porcelain insulator return duct or column 34, the return duct being generally coextensive with the porcelain insulator section 24 of the pothead. The oil is then taken from the bottom or grounded end of the insulator return duct 34 via pipes 36 to the heat transfer means 30, schematically illustrated as a heat exchanger of any conventional type employing gas or liquid coolant at ambient or sub-ambient temperatures. The cooled oil is then fed to the circulating pump 28 which forces the oil through a filter and by-pass system 38 to the lower portion or base of the entrance body 26 via further pipes 40.

The oil circulating filter and by-pass system 38 includes a filter 41 employing activated clays and/or molecular sieve materials to remove any undesirable elements from the oil, by selective adsorption and mechanical action. For example, the filter 41 mechanically removes metal dusts, particles or compounds which could have a deleterious effect on the system. Residual peroxide compounds, which may be produced if any copper, steel and other catalytic action metals are not effectively "isolated" from the insulating dielectric oil, are thereby removed. Since the peroxide compounds tend to increase the power factor of the oil at high temperatures, removal of such compounds helps to maintain the best dielectric characteristics of the oil. In addition, these filter materials will help remove any trace water content contained in the oil.

The filter 40 may be by-passed by the opening of by-pass valve 42 and the closing of input and output filter valves 44 and 46, respectively, to allow reactivation or replacement of the filter material. A bleed valve 48 is located adjacent output filter valve 46 for bleeding the system of air which would be highly detrimental to the dielectric characteristics of the cable termination.

Consequently, a closed loop hydraulic system is formed whereby the coolant oil is circulated through the interior of the high voltage pothead 22 in a separate loop from the dynamic cooling system employed in conjunction with the main pipe cable system 12. By removing heat from the cable termination and releasing it at the heat exchanger 30, a considerable increase in the current carrying capacity of the cable within the pothead is achieved.

Figure 3:
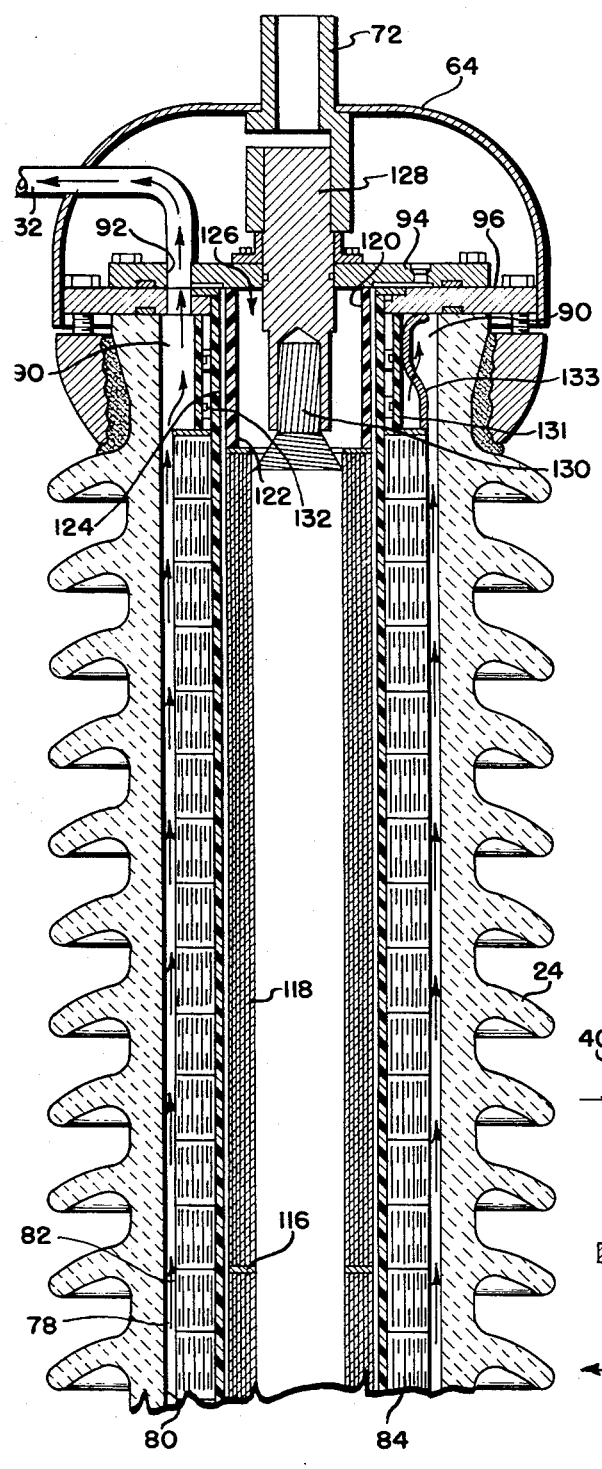
FIGS. 2 and 3 are sectional views showing, respectively, the lower and upper portions of the pothead shown in FIG. 1.
Figure 2:
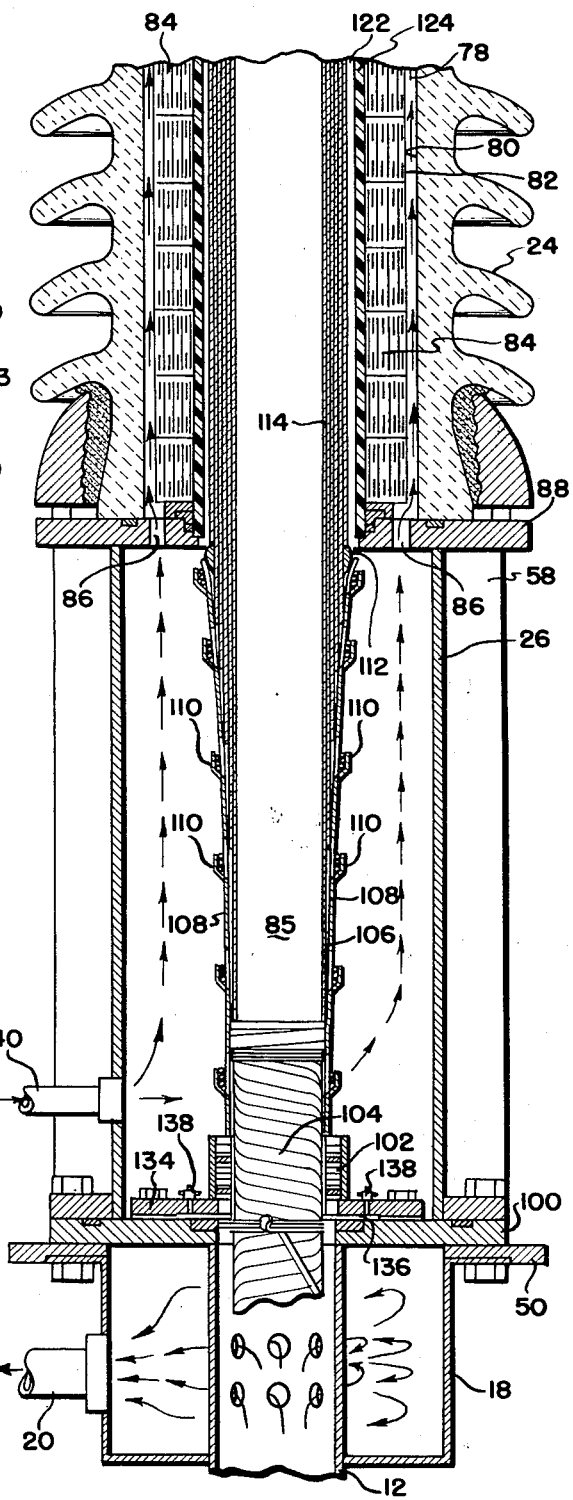

The pothead 22, the structure of which will be described in greater detail hereinafter in connection with FIGS. 2 and 3, is supported in conventional fashion by means of a mounting plate 50 fastened in any suitable manner to the base or entrance plate of the body section 26. The mounting plate 50 is in turn supported on steel framing 52 by means of insulator bushings 54 through which plate 50 is bolted as shown in FIG. 1. The plate 50 and support framing 52 may also support the riser pipe manifold 18, which will be described in greater detail in connection with FIG. 2. The insulator return duct 34 is supported on a metal bracket 56 which is bolted to the entrance body section 26 of the pothead on vertical ribs or vanes 58 which increase the rigidity of the cylindrical body walls and also increase the heat transfer surface. The return piping 36 may be connected to the end plate 60 at the bottom of the insulator return duct 34 by any conventional means; and likewise, the pothead exhaust return pipe 32 at the top of the assembly may be connected to the end plate 62 at the upper end of the return duct 34 by any conventional means.

Corona shields 64 and 66 are respectively mounted over the upper ends of the pothead and return duct assemblies, and have appropriate respective apertures 68 and 70 to accommodate the pothead exhaust return pipe 32. The pothead corona shield 64 also has an additional aperture at the upper center thereof to accomodate the terminal means, illustrated as aerial connector stub 72, which protrudes therethrough as shown, and which makes an electrical and mechanical connection to the exposed end of the aerial conductor 74 in conventional fashion. A metal spacer bracket 76 is mounted across and between the upper conductive portions of the pothead and return duct to maintain structural support for rigid spacing and conductively interconnects the upper conductive portions of the two assemblies so that all of the conductive portions thereof are at the same, high voltage which is present on the aerial conductor 74. On the other hand, all of the conductive portions at the bottom of the respective assemblies are, of course, normally at or very close to ground potential.

Referring now to FIGS. 2 and 3, there is shown in greater detail the interior structure of the pothead 22 and a portion of the riser pipe manifold 18. The high voltage pothead 22 is basically of a known construction with certain modifications, to be hereinafter described, so that it may be incorporated in the dynamic cooling system of the present invention. In fact, based on the recognition of the principles discussed in the introductory portion of the present application, the embodiment of the invention illustrated in FIGS. 1 through 3 involve a minimum of modification from known pothead constructions for some cable terminations, while providing effective internal cooling by oil circulation therethrough. This stems from the fact that capacitor graded potheads, are known and available which have an annular space or gap 78 already present between the insulator bore surface 80 and the outside diameter surface 82 of the capacitor stack 84, and which defines an annular passage having a cross-sectional area (in the direction of flow) which is large enough to permit sufficient coolant flow therethrough for adequate cooling of the termination. That is, to permit a flow which will remove sufficient heat to enable the conductor of cable 85 within the pothead to carry an increased current load. Of course, the oil circulation cooling system is not restricted to just capacitor types of potheads, but is applicable to other types as well where appropriate modifications are incorporated.

The annular flow passage 78 of the capacitor pothead communicates, at its lower end, with the interior of the body section 26 through multiple ports 86 positioned circumferentially within insulator support ring 88 which serves as an intake manifold to promote uniform flow within the passage 78. The ports 86 are thus arranged in general alignment with the annular passage 78, and are sufficient in number to provide a relatively uniform upward flow through the passage 78 without unduly weakening the insulator support ring 88. The oil intake pipe 40 is connected to the lower portion of the entrance-body wall by any suitable means, and provides the supply of cooled circulating oil which is forced upwards within the cavity defined by the entrance-body 26, through the annular passage 78, and into the upper portion 90 (FIG. 3) of the pothead, above the capacitor stack 84. This oil flow is generally shown by the various arrows, and acquires heat as it flows through the pothead, increasing in temperature, until it passes through exhaust port 92 in the stainless steel upper closure plates 94 and 96, which form an upper manifold. The oil is then forced out of the pothead through exhaust return pipe 32, connected to the insulator return duct 34 (FIG. 1).

More particularly, the pothead of FIGS. 2 and 3 is shown with a cable 85 fully installed in a more or less standard manner, wherein the cable portion extending from the riser manifold 18 has been prepared for the termination by conventional techniques and through the entrance opening in base plate 100 and through a gland 102 which forms an oil semi-stop seal against the cable shield 104. The shield 104 is conductively connected to the pothead body and grounded in conventional manner.

The shield is terminated in a stress relief cone formed from a perforated stress control paper roll covered with a woven wire cloth braid 106 and supported by generally vertical straps 108 spaced circumferentially about the cable in a spaced apart arrangement and held together by wire servings 110 disposed within cutout offsets spaced axially along the cable. The upper end of the cloth braid shielding is terminated at 112 with a shield band of copper and crepe paper tape. The stress control paper roll, shown generally as 114, is disposed in the usual manner about the cable inner insulation and extends upwardly along the cable a substantial distance, terminating at 116 (FIG. 3), which may be at least halfway up the terminator. An auxiliary blocking paper roll 118 then extends the remainder of the distance along the insulation of cable 85, terminating at blocking cylinder 120 clamped between the end of the auxiliary paper roll 118 and the upper plate 94.

The paper rolls 114 and 118 are oil impregnated, forming very thin oil layers of high dielectric strength, and a very small oil gap 122 is defined between the outer surface of the paper roll and the capacitor stack barrier support tube 124. The blocking cylinder 120 is slotted (not shown) to permit the cavity 126 defined therewithin to be filled with oil, as are all of the remaining zones within the interior space of the pothead. The ferrule portion of connector 128 is disposed within the cavity 126 and receives the bared conductor 130 of the cable 85 which may be compressed or soldered within the ferrule. The connector passes through the upper plate 94 with an O-ring seal to prevent oil leakage and has mounted at its upper end the aerial connector stub 72 to which the aerial conductor 74 is connected (FIG. 1).

The capacitor stack barrier support tube 124 is typically formed of epoxy or phenolic material, and the ring-shaped or annular capacitor elements are stacked about the tube. An oil impregnated crepe paper insulation may be wrapped from the bottom of the pothead to the top, over the outer cylindrical surface formed by the capacitor stack, but maintaining the largest permissible gap or spacing to the bore wall 80 of the insulator 24. A capacitor stack blocking cylinder 131 is disposed about the capacitor stack barrier support tube 124 above the capacitor stack and is clamped between the stack and the plate 96, being spaced from the tube 124 by spacer rings 132, as shown. Connection lead 133 is shown from the capacitor stack to a suitable terminal in the plate 96, the connection lead from the bottom of the capacitor stack being connected to ground (not shown) in conventional manner.

Thus, with the particular pothead construction shown, the oil flowing in the annular passage 78 at the upper portion of the pothead (FIG. 3) fills the cavity 90 from all radial points, such as from about the connection lead 133, etc., and flows outward through the exhaust return pipe 32. The manifold plate 96 may have its lower surface contoured in a manner to promote uniform flow from the annulas 78 to the exit port 92. At the same time, the oil which fills the stress control insulation and condenser portion of the pothead remains essentially static, so that the radial flow of heat through the relatively poor thermally conductive, but high dielectric strength, regions, is removed by the dynamic oil flow which is radially beyond the stress control insulation and within the region of generally low electric field strength (as compared with the region within the pothead closer to the conductor). Thus, in this manner, the heat produced by the $I^2R$ losses in the conductor, the dielectric losses in the stress control insulation and capacitors, and the solar radiation incident on the outer surfaces of the porcelain insulator is transferred to the flowing oil and removed from the pothead structure.

In the illustrated embodiment, the oil pressure is maintained at between 200 and 300 psi by the main hydraulic system associated with the pipe cable 12, although that system is separate but not completely isolated from the closed loop hydraulic system associated with the pothead. More particularly, the oil within the riser pipe is normally maintained at a pressure of between 200 and 300 psi by the main pumping station, and the riser pipe manifold 18 is provided at the base or entrance to the pothead to provide a uniform oil flow from the riser pipe 12 to the main return pipe 20 by means of uniformly arranged inlet apertures about the surface of the pipe within the manifold. An inner entrance plate 134 is bolted to the inner surface of the base entrance plate 100 and defines an exterior recess or cavity 136 about the cable 85 which communicates with the interior of the riser pipe 12. The inner entrance plate 134 supports the gland semi-stop seal 102 which is mounted thereto, and also supports a plurality of check or pressure regulating valves, (with respectively associated oil filters), designated schematically as 138, which have their input ports communicating with the external recess 136 and their output ports communicating with the interior of the entrance-body section 26 of the pothead. The valves 138 block or restrict flow in the entry and reverse directions from the body 26 to the pipe 12, but open under a small pressure differential in either direction, but only through very small apertures. Consequently, the oil pressure within the pothead body 26 is maintained at approximately the same pressure as the riser pipe 12, while very little flow takes place between the two systems.

The filters associated with the check valves are employed to prevent any metal or dirt particles, etc., from entering the oil system within the pothead insulation to prevent it from detrimentally affecting the dielectric characteristics of the pothead cable termination.

Thus, the circulating pump 28 in the cable termination cooling system 10 merely circulates the oil at the nominal pressure of the system, and does not have to produce the high pressure required for the cable termination operation. This permits a relatively small pump and uncomplicated hydraulic system to be employed. Although the direction of coolant flow in the illustrated system is from the bottom to the top of the pothead, it is conceivable that the opposite direction of flow might be employed, but perhaps less advantageously. Also, it is desirable, especially where a sub-ambient cooler is employed, to minimize the length of the intake pipes from the heat exchanger to the intake port of the pothead.

Referring now to FIGS. 4 through 8, an alternative embodiment of the invention is shown wherein a plurality of flow passages parallel to the pothead axis are provided between the stress controlling insulation and the porcelain insulator bore to produce coolant flow in opposite directions within the pothead, eliminating the external insulator return duct employed with the embodiment of FIG. 1. Turning first to FIG. 4, there is shown a pothead 200 which is basically similar in construction to the pothead 22 shown in FIG. 1, but modified in a different manner. Although there are some minor differences in structure within the stress controlling insulation region bounded radially by the capacitor stack 204 and at the upper end of high voltage connection to the cable 202, these differences merely represent alternative structural arrangements to those shown in FIGS. 1 through 3, and will not be discussed in detail.

Moreover, for the purposes of the present invention, the stress relief cone, shielding termination and stress control paper rolls employed in the pothead 200 are substantially the same as those corresponding elements of pothead 22 previously discussed in connection with the embodiment of FIG. 1, while the capacitor stack 204, and related barrier support tubes are likewise substantially the same as those corresponding components previously discussed, and their description will not be repeated. On the other hand, those structural features of the pothead 200 which more directly relate to the cooling system of the present invention are described in detail below.

At the outset, it should be understood that the pothead 200 of FIG. 4 is adapted to be placed into the general cooling system shown in FIG. 1, but now intake pipe 40 and return pipe 36 are both connected to the pothead body 206. The riser manifold 18 associated with the riser pipe 12 and main hydraulic system may also be employed in conjunction with the pothead 200, but is not shown in FIG. 4; and likewise, the various mounting brackets and framework which are conventional structures are also not shown in FIG. 4 for clarity of illustration.

As shown by the arrows in FIG. 4, and by means of the circulating pump 28, the cool oil flows from the intake pipe 40 to an internal intake pipe 208 within the body section 206, which isolates this oil generally from the interior thereof. The upper end of the internal intake pipe 208 is connected to an intake port 210 of a lower annular manifold 212, the bottom view of which is shown in FIG. 8. The oil flows within the chamber of manifold 212 and discharges from multiple exhaust ports 214, shown best in the top view of FIG. 7. As can be seen, in the illustrated embodiment there are three such exhaust ports 214 symmetrically spaced in a Y arrangement and equally spaced from the pothead axis. Each of the exhaust ports 214 communicates with an individual axial flow passage channel or duct within the gap 215 between the outer radial surface of the condenser stack 204 and the bore wall 216 of the outer porcelain insulator section 218 through respective apertures 220 symmetrically arranged in a concentric circle in support plate 222 and aligned with the exhaust ports 214. The individual upward flow channels within the gap 215 are perhaps shown best in FIG. 5 as 224, and are defined by ribs or dividers 226 which are parallel to the pothead axis and spaced uniformly within the gap 215 to form radial planes or projections therewithin. The dividers 226 may be formed integrally with the outer porcelain insulator 218, or may be formed as discrete members and made of any suitable insulating material.

The dividers 226 also inherently define alternately spaced flow passage channels or ducts 228 for downward oil flow through the pothead. The transition of the oil from the upward flow passages 224 to the downward flow passages 228 is accomplished by an upper annular manifold 230. The upper manifold 230 is shown best in the horizontal sectional view of FIG. 6, and comprises a series of circumferentially arranged flow channels 232 therewithin which are disposed as equally spaced segments of a circle generally aligned with the gap or annulas 215. Each of the channels 232 has an intake port 234 at one end thereof and an exhaust port 236 at the other end, each port being in respective communication with adjacent upward and downward flow passages 224 and 226. The manifold 230 also comprises divider or separator projections 238 extending from the lower surface thereof and spaced along the circumference of the manifold at positions generally in alignment with the gap dividers 226 to restrict any cross-flow between adjacent passages other than through the manifold. Of course, if the upper portions of each of the dividers 226 are suitably adapted for sealing engagement with the bottom surface of the upper manifold 230, then the separators 238 may be eliminated. The upper or cover portion 240 of the manifold 230 covers the channels 232 and may be hollowed out in a pattern so as to permit sufficient cross-sectional flow area to avoid impeding the oil circulation. The upper portion 240 of the manifold 230 may be generally humped, as shown in FIG. 4, to define a common circular channel which communicates with all of the segmented channels 232 so that the oil from the upward flow channels 224 commingles within the upper portion of the manifold 240 and is then uniformly distributed to the downward flow channels 228 through the segmented channels 232.

The oil is forced through the three downward channels 228 from the exhaust ports 236 of the upper manifold 230 to the bottom of the gap 215. Three short axially oriented tubes 242 communicate with the bottom of each of the respective downward flow passages 228, being mounted within respectively aligned apertures 244 in the support plate 222 and passing through holes 246 in the lower manifold 212 (FIG. 7). Thus, as shown in FIG. 8, each of the exhaust tubes 242 extends completely through and protrudes from the manifold 212 so as to be completely isolated from the internal chamber of the manifold 212. That is, they pass through the chamber of the lower manifold without any communication therewith and feed directly into the entrance-body section 206 which is thus completely filled with the circulating oil. The oil then returns to the heat exchanger 30 via the return pipe 36 connected to the wall of the body 206 near the bottom of the terminator.

As in the embodiment illustrated in FIGS. 2 and 3, the pressure of the oil within the pothead is maintained at between 200 and 300 psi by the main hydraulic system within the pipe 12 through the check or pressure regulating valves and filters 248 which communicate with the interior of the pipe 12 through a cavity 250 defined on the exterior side of the inner entrance plate 252, the cavity being filled with the pipe oil through a space between the cable 202 and a resilient bushing 254. The plate 252 is bolted to the inside surface of the outer entrance base plate 256 and supports a gland seal 258, of well known design, similar to that employed in the embodiment of FIGS. 2 and 3.

The lower annular manifold 212 may be mounted at the top of the body section 206 by welding or any other suitable means, and the upper annular manifold 230 may be mounted on top of the capacitor stack 204, about the capacitor barrier support tube, and clamped in place by a blocking tube 260 of any rigid insulating material which abuts at its upper end the interior surface of the upper plate assembly 261 of the pothead.

Thus, cooling is accomplished by the bidirectional (i.e., 50 percent up and 50 percent down) forced flow of the coolant oil dielectric through the alternate six passages (three up and three down) in the annular space or gap of the pothead between the capacitor stack and the bore of the porcelain insulator. The oil which impregnates and fills the stress control regions of the pothead remains essentially static, since it is generally out of the normal circulating oil flow path, and cavity regions above the upper manifold 230 will also be filled with oil under essentially static pressure conditions. These static pressure regions, however, will be continuously supplied with oil, since the entire system is filled and sealed. Suitable O-rings and various seal arrangements are provided and generally illustrated. Since it is not necessary to have any oil flow from the top of the pothead 200, it is completely sealed and a corona shield 262 is disposed thereover having an opening along the axis of the pothead through which the aerial connector 264 protrudes.

It should be understood that the upward and downward internal flow passages need not be straight vertical passages as in the illustrated embodiment, but may, for example, comprise respective upward and downward insulated tubes wrapped in helical form about the capacitor stack which will still provide generally axial flow through the pothead cable termination.

In regard to all of the embodiments herein described, the rate of flow of the circulating insulating liquid may be adjusted by adjusting the pumping rate of the circulation pump 28 or by the use of appropriate valves in the loop. The flow rate of insulating liquid can be adjustable or fixed, depending upon the degree of heat removal required and the nature of any given installation.

Although the embodiment illustrated in FIGS. 1 through 3 requires an external "downward" flow insulator column connected to the high voltage end of the pothead, and thus requires a greater amount of overall space than the embodiment of FIG. 4, it will generally result in a somewhat more efficient heat transfer system for the cable termination. Also, it requires a relatively simpler pothead construction than that of FIG. 4, since the more complicated ducts are not required and only simple manifolds are necessary at the top and bottom of the assembly to promote relatively uniform liquid flow throughout the cross section of the annulas formed by the gap between the O.D. of the capacitor stack and the porcelain insulator bore. Further, the delivery of the hot circulating liquid dielectric directly to the heat exchanger (whether ambient or sub-ambient) through an external insulator column considerably reduces the volume of dielectric which will generally be required to be circulated per minute to result in effective cooling of the termination.

Thermal calculations made on a conventional 345 KV. capacitor control type pothead cable termination of 2,500 mcm pipe type cable have indicated that the maximum continuous cable current should be limited to approximately 1,200 amperes if the conductor temperature is to be kept within a 85° C limitation for continuous operation with a maximum ambient air temperature of 40° C. These calculations also indicate that "emergency" overload currents should be limited to approximately 1,500 amperes if the conductor temperature is to be kept within a 100° C limitation for "emergency" overloads not exceeding 100 hours. However, in the use of the dynamic cooling system in accordance with the principles of the invention, design calculations indicate that the same cable conductor may safely carry 1,600 amperes continuously and 1,850 amperes emergency overloads if the circulating dielectric temperature within the bore of the pothead insulator is maintained at a temperature of 20° C to 25° C. This represents an increase of over 33 percent in the continuous current capacity and over 23 percent in the overload current capacity of the cable termination. Of course, as previously indicated, the degree of cooling required in the heat exchanger for any given installation will be dependent upon the temperature of the ambient air or pothead enclosure media, the amount of solar radiation and the time integral of the cable conductor current, and these factors will not only be different from one installation to another, but will vary at any one installation. Accordingly, if desired, the dynamic cooling system of the present invention can be programmed by the cable system load dispatcher or by a suitable thermostatic unit control to provide the required cooling.

In the construction of the cable terminations in accordance with the present embodiments of the invention, it is desirable, as previously indicated, to coat the catalytically active metal parts which may be exposed to the insulating dielectric liquid with some non-active metallic or non-metallic material. Hot tinning of the steel, copper or copper alloy parts is one method of effectively "isolating" the insulating liquid from the catalytic action of these metals. Further, if desired, the riser pipe oil manifold system may be incorporated within the pothead body with suitable baffling, such as an oil baffle in the form of a cone spaced about the stress relief cone and cable within the entrance-body section of the pothead, for more effective cooling at the base of the pothead. The isolating barriers or cone prevent any erosion effects of the flowing oil on the cable and paper, and may be hydraulically communicative with the pothead oil system by use of check valves and filters.

The liquid dielectric employed in the cooling system of the present invention is identical to the cable system oil. It may be any mineral or synthetic insulating liquid commonly employed as a liquid dielectric and having a sufficiently low viscosity to readily flow at the temperatures to which it will be subjected.

The principles of the present invention which have been described herein are also applicable to provide a system for circulating insulating dielectric liquid axially through the pothead termination of low pressure and static oil cable systems, as well as of the illustrated pipe type cable systems, and can, in this manner, economically achieve a considerable increase in the current carrying capacity of the cable within the pothead and effectively increase the energy transferring capabilities of the entire cable system.

Although only certain particular embodiments of the present invention have been illustrated and described, it is understood that various modifications will be apparent to those skilled in the art; and accordingly, the scope of the invention should be defined only by the appended claims and equivalents thereof.

Various features of the invention are set forth in the following claims.

What is claimed is:

1. A dynamic cable termination cooling system, comprising an electric pothead having stress controlling insulation about the cable conductor, an outer insulator about said insulation, and a low field strength region, relative to other regions of the pothead, located radially between the outer surface of said insulation and the inner surface of said outer insulator and extending generally along the length of the pothead, a flow passage within said pothead disposed entirely within said low field strength region for approximately the axial length of said stress controlling insulation and containing an insulating dielectric liquid, and means for providing an essentially closed loop for circulation of the dielectric liquid through said flow passage, said means including heat transfer means for cooling said dielectric liquid and a pump for circulating said liquid about the loop, through said flow passage and heat transfer means, said loop generally confining the circulation of the dielectric liquid to said low field strength region of the pothead for flow through said pothead along the length of the stress controlling insulation regions thereof.

2. The system of claim 1 wherein said pothead includes an annular capacitor stack concentrically arranged about said stress controlling insulation, and said flow passage is disposed in a gap between the radially outer surface of said stack and the bore wall of said outer insulator.

3. The system of claim 2 wherein said flow passage is cylindrical about the pothead axis and formed by the annulus of the gap between said outer surface of the capacitor stack and said insulator bore wall, said circulating means comprising means for conducting the dielectric liquid in only one axial direction through said passage.

4. The system of claim 1 wherein said circulating means comprises a return duct, one end of said return duct being coupled to said passage at the normally high voltage end of said pothead and the other end of said return duct being coupled to said heat transfer means, and said return duct being disposed external to said pothead.

5. The system of claim 4 wherein said return duct comprises an insulator column.

6. The system of claim 1 wherein said pothead comprises a hollow body section at the normally grounded end thereof adjacent an end of said outer insulator, said liquid circulating means being coupled to said body section for flowing the dielectric liquid therethrough, and a manifold disposed between said body section and said flow passage to promote a uniform flow through said passage.

7. The system of claim 6 wherein said pothead comprises an additional manifold at the other end of said flow passage to promote a uniform flow through said passage.

8. The system of claim 6 wherein said flow passage comprises a plurality of separate ducts, and said manifold comprises means for passing flow in one axial direction in one of said ducts and in the opposite direction from another of said ducts.

9. The system of claim 6 wherein said pothead comprises an additional manifold at the other end of said ducts for receiving the dielectric liquid flow in one axial direction and discharging the dielectric liquid flow in the opposite axial direction through respective ones of said ducts.

10. The system of claim 1 wherein said liquid circulating means comprises filtering means for maintaining the dielectric qualities of said insulating liquid.

11. The system of claim 1 for use with an insulating liquid filled pipe-type cable system, comprising means communicating between said pothead body and the pipe cable system for maintaining the insulating liquid under a pressure approximately equal to that of the liquid within the pipe.

12. The system of claim 1 wherein said circulation loop is confined generally to said cable termination.

13. A method for dynamically cooling an electric cable termination for use with an oil filled pipe-type cable system, comprising the steps of flowing an insulating dielectric liquid axially through the pothead within a region of low field strength relative to other regions within said pothead, cooling the insulating liquid externally of said pothead, recirculating the cooled insulating liquid through said low field regions of said pothead, and maintaining the pressure of the insulating liquid within said pothead at approximately the same pressure as the pipe oil by pressure regulating means coupled therebetween.

14. The method of claim 13 wherein said pothead comprises stress controlling insulation and an outer insulator, and said recirculating insulating liquid is passed between the stress controlling insulation and the outer insulator of said pothead.

15. The method of claim 14 wherein the insulating liquid is circulated through said pothead in only one axial direction.

16. The method of claim 15 wherein the insulating liquid is fed into said pothead at its normally grounded end and discharged from said pothead at its normally high voltage end.

17. The method of claim 14 wherein the insulating liquid is circulated through said pothead in opposite axial directions.

18. The method of claim 17 wherein half of the total insulating liquid flow is in each axial direction, and the insulating liquid is fed into and discharged from said pothead at its normally grounded end.

19. A dynamic cable termination cooling system comprising:
a high voltage pothead having an outer cylindrical insulator and inner stress controlling insulation within said outer insulator disposed about a central conductor defining the axis of the pothead,
terminal means disposed at one end of said insulator and electrically connected to said central conductor,
a hollow conductive body affixed to the other end of said insulator and disposed about said conductor in insulated relation thereto,
means for providing a liquid-tight seal at the entrance of said conductor to said body and between said one end of said insulator and said terminal means,
a liquid flow passage located between said insulation and said outer insulator, said passage communicating at said other end of said insulator with the interior space defined by said terminator body, and
means coupled to one end of said passage and to said body for defining a loop for circulating an insulating liquid therethrough, said loop being generally confined to said cable termination and including said passage and body, heat transfer means for removing heat from said liquid, and a pump for circulating said liquid about said loop.

20. The system of claim 19 wherein said means comprises means for maintaining the dielectric qualities of said insulating liquid.

21. A dynamic cable termination cooling system comprising:
a high voltage pothead having an outer cylindrical insulator and inner stress controlling insulation within said outer insulator disposed about a central conductor defining the axis of the pothead,
terminal means disposed at one end of said insulator and electrically connected to said central conductor,
a hollow conductive body affixed to the other end of said insulator and disposed about said conductor in insulated relation thereto,
means for providing a liquid-tight seal at the entrance of said conductor to said body and between said one end of said insulator and said terminal means,
a liquid flow passage located between said insulation and said outer insulator, said passage communicating at said other end of said insulator with the interior space defined by said terminator body,
cooling means coupled to one end of said passage and to said body for circulating an insulating liquid through said passage and body, said cooling means including a pump and heat transfer means for removing heat from said liquid,
means for dividing said liquid flow passage into a plurality of separate axial ducts, and
manifold means for causing the insulating liquid to flow in one axial direction in one of said ducts and in the opposite axial direction in another of said ducts.

22. The system of claim 21 wherein said manifold means comprises a first manifold disposed between said hollow pothead body and selected ones of said ducts to permit liquid flow toward said one end of said passage, and a second manifold disposed at said one end of said passage to permit liquid flow toward said body through selected others of said ducts.

23. The system of claim 22 wherein said first manifold comprises means for receiving the liquid flow from said selected other of said ducts and discharging the same into said body.

24. A dynamic cable termination cooling system comprising:
a high voltage pothead having an outer cylindrical insulator and inner stress controlling insulation within said outer insulator disposed about a central conductor defining the axis of the pothead,
terminal means disposed at one end of said insulator and electrically connected to said central conductor,
a hollow conductive body affixed to the other end of said insulator and disposed about said conductor in insulated relation thereto,
means for providing a liquid-tight seal at the entrance of said conductor to said body and between said one end of said insulator and said terminal means,
a liquid flow passage located between said insulation and said outer insulator, said passage communicating at said other end of said insulator with the interior space defined by said terminator body,
cooling means coupled to one end of said passage and to said body for circulating an insulating liquid through said passage and body, said cooling means including a pump and heat transfer means for removing heat from said liquid, and
a duct external to said pothead coupled between said one end of said flow passage and said heat transfer means.

25. The system of claim 24 wherein said pump discharges the cooled insulating liquid from said heat transfer means to said pothead body, and said external duct conducts the heated insulating liquid from said pothead to said heat transfer means.

26. The system of claim 24 wherein said external duct comprises an insulator column.

27. A dynamic cable termination cooling system for use with an oil filled pipe-type cable system, comprising
a high voltage pothead having an outer cylindrical insulator and inner stress controlling insulation within said outer insulator disposed about a central conductor defining the axis of the pothead,
terminal means disposed at one end of said insulator and electrically connected to said central conductor, a hollow conductive body affixed to the other end of said insulator and disposed about said conductor in insulated relation thereto, means for providing a liquid-tight seal at the entrance of said conductor to said body and between said one end of said insulator and said terminal means, a liquid flow passage located between said insulation and said outer insulator, said passage communicating at said other end of said insulator with the interior space defined by said terminator body, cooling means coupled to one end of said passage and to said body for circulating an insulating liquid through said passage and body, said cooling means including a pump and heat transfer means for removing heat from said liquid, and means communicating between said pothead body and the pipe cable system to maintain the insulating liquid under a pressure approximately equal to that of the pipe cable oil.

* * * * *